UNITED STATES PATENT OFFICE.

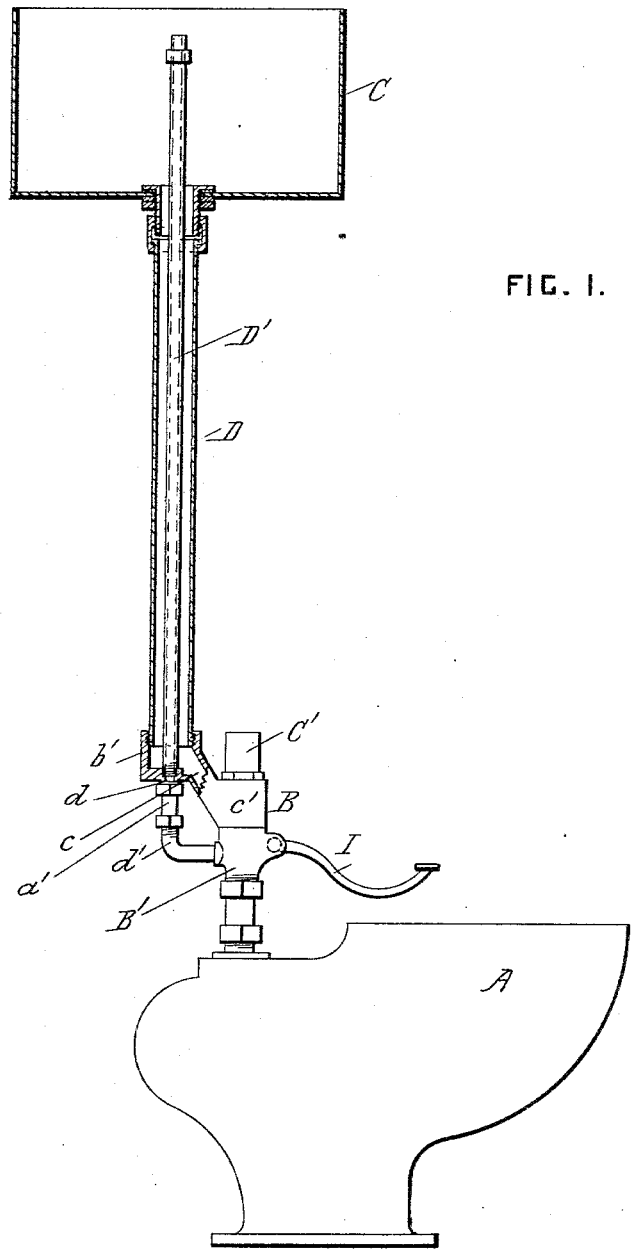
(No Model.) 2 Sheets—Sheet 1.
D. T. KENNEY.
WATER CLOSET.
No. 566,771. Patented Sept. 1, 1896.
FIG. I.
Witnesses
Inventor
David T. Kenney
By Attorney

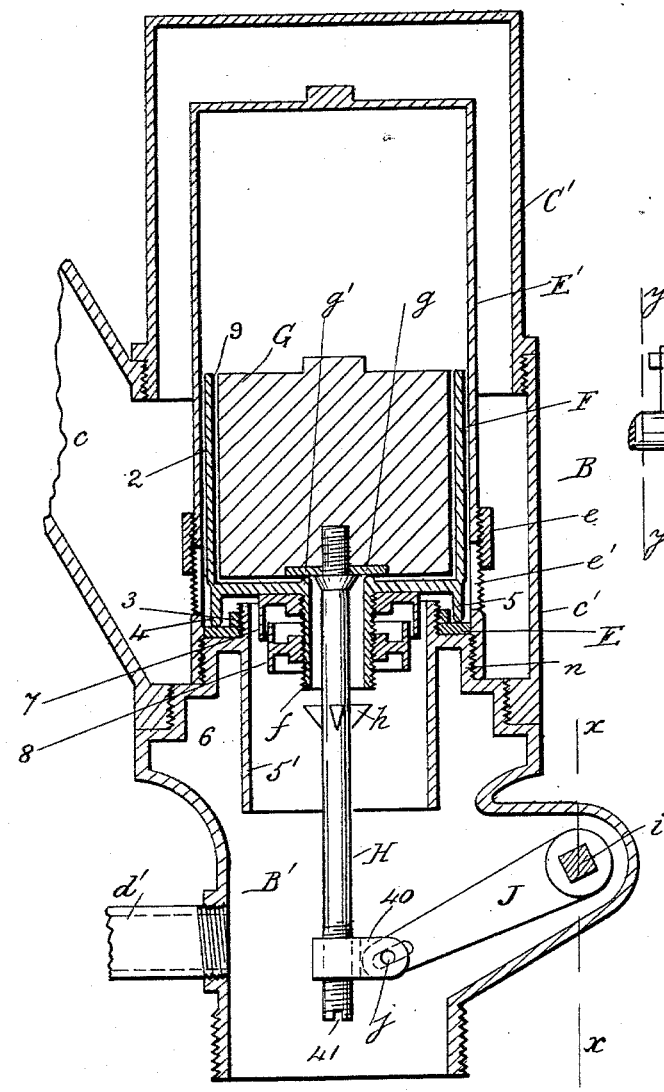

DAVID T. KENNEY, OF NORTH PLAINFIELD, NEW JERSEY.

WATER-CLOSET.

SPECIFICATION forming part of Letters Patent No. 566,771, dated September 1, 1896.

Application filed November 26, 1895. Serial No. 570,174. (No model.)

*To all whom it may concern:*

Be it known that I, DAVID T. KENNEY, a citizen of the United States, residing at North Plainfield, in the county of Somerset and State of New Jersey, have invented certain new and useful Improvements in Water-Closets; and I do hereby declare the following to be a full, clear, and exact description of the invention, such as will enable others skilled in the art to which it appertains to make and use the same.

This invention relates to water-closets; and it consists in the novel construction and combination of the parts hereinafter fully described and claimed.

In the drawings, Figure 1 is a side view of a water-closet, showing its cistern and supply-pipe in section. Fig. 2 is a vertical section of the flushing-valve. Fig. 3 is a section taken on the line $x\,x$ in Fig. 2. Fig. 4 is a cross-section taken on the line $y\,y$ in Fig. 3.

A is the pan of the closet, which is of any approved construction.

B is the flushing-valve, arranged in close proximity to the pan and provided with a curved operating-lever I.

C is the water-cistern, which is supported above the pan and is provided with a ball-valve or other approved means for regulating the supply of water to it. (Not shown in the drawings.)

B' is the outlet-chamber of the flushing-valve, which is secured to the pan in any approved manner.

D is the water-supply pipe, connected to the under side of the cistern and to the valve B. The upper end of the pipe D is connected to the cistern by a union or other approved fastening, and its lower end is screwed into a socket $b'$, which is provided with a passage $c$, connecting it to a base portion $c'$, which forms a portion of the inlet-chamber of the valve B.

C' is a cap secured to the base portion $c'$ and forming together with it the inlet-chamber of the said valve.

D' is the overflow-pipe, which passes vertically through the pipe D and is screwed into the bottom of the socket $b'$. A boss or nipple $d$ projects from the socket $b'$, and $d'$ is an elbow-pipe, which is connected to the outlet-chamber B' of the flushing-valve. A short pipe $a'$, provided with unions, forms a slip joint or connection between the nipple $d$ and the elbow-pipe $d'$, so that when the water rises too high in the cistern it will flow down the overflow-pipe into the pan. The upper end of the overflow-pipe is provided with a support to keep it steady. The overflow-pipe is arranged inside the supply-pipe for neatness and also to prevent the formation of vortex whirls in the supply-pipe. The supply-pipe does not require to be much larger when the overflow-pipe is placed inside it, and the noise caused by the whirling around of water in the pipe and drawing air down its center is prevented.

E is the seat for the main valve at the top of the chamber B', and E' is the casing for the main valve, screwed onto the cylindrical portion $n$, which projects within the base portion $c'$ of the valve-chamber. The casing E' is cylindrical, and is closed at the top and provided with holes or slots $e'$ in its periphery, close above the valve-seat E. A ring $e$ is slidable vertically upon the casing E', and may be secured in any desired position, so as to regulate the passage of the water through the slots $e'$. The ring $e$ is preferably screwed on the casing and is moved vertically by turning it around thereon.

F is the main valve, which slides freely in the cylindrical casing E', and a very small annular passage 2 is formed between the casing and valve for the passage of water. This passage 2 connects the upper and lower portions of the casing, and it may be formed in any other approved manner. For instance, it may be a groove in the valve. The valve F is cylindrical internally and has a downwardly-projecting tubular stem $f$ at its base. The main-valve seat E is secured by a nut 3 in an annular recess 4, and the valve F is provided with an annular projection 5, which rests on the said valve-seat. The said valve-seat is preferably of soft material, such as leather, and the recess 4 forms a water seal for the valve and also prevents the valve-seat from being dragged into the opening through which the water rushes when the valve is raised. A cylinder 5 depends from the upper part of the chamber B', and its upper part forms the inner side of the annular recess 4 and has the nut 3 screwed on it for holding the valve-seat in place. An air vessel 6 is formed by the cylinder 5 in the upper part of the chamber B'. The air in the air vessel 6 lets the water fall freely away from the valve F when there is a tendency to form a vacuum in the said chamber. The tubular stem $f$ is screw-threaded and has two short telescopic cylinders 7 and 8 screwed upon it. The upper cylinder 7 is preferably the larger and may be secured in any other approved manner concentric with the stem $f$, and the cylinder 8 is movable inside the cylinder 7, so as to project from it to a greater or less extent.

G is the vent-valve, which slides freely in the valve F, a very small passage 9 being arranged between them for the water to pass through. A facing $g$, of soft material, such as leather, is secured to the bottom of the valve G and rests on the seat $g'$, formed inside the valve F around the upper end of its stem $f$.

H is the stem of the vent-valve, provided with a projection $h$, which comes a little below the bottom of the stem $f$ when the valve G is closed. The stem H is operated by the connection or double eye 40, screwed on its lower part, and its lower end is provided with a notch 41 for the insertion of a screw-driver or any other approved means for revolving the said stem.

I is a lever for operating the flushing-valve. This lever projects from a spindle $i$ and is bent around so as to place its free end in any convenient position with respect to the pan.

J is an arm secured on the lever I in the chamber B'. This arm is pivotally connected with the lower end of the valve-stem H by the pin $j$ and the adjustable double eye 40, screwed on the lower end of the stem H.

K is the stuffing-box on the outlet-chamber B'. The spindle $i$ is journaled in this stuffing-box, and is provided with a screw-threaded end $k$.

M is an externally-screw-threaded bearing on the chamber B', and $m$ is a cylindrical nut screwed on the end $k$ and journaled in the bearing $m$. The nut $m$ has a shoulder $m'$ at its end, which bears against the end of the bearing M and prevents the spindle from sliding longitudinally in the stuffing-box.

N is a cap screwed over the end of the bearing M for keeping the chamber B' watertight. An arm 10 is pivoted to the stuffing-box K by the pin 11, and has a forked portion 15, which engages with the nut of the stuffing-box and prevents it from working back. A stop 13 is formed on the spindle $i$ and strikes against the end of the arm 10 when the lever I is depressed to its full extent. As persons using the device can see the stop strike the arm they are less likely to try to push down the lever farther than it should go than if its travel was determined by an internal stop which could not be seen.

When the flushing-valve is closed the water stands in the supply-pipe free from air and ready to rush noiselessly into the pan as soon as the valve is opened.

The pan is flushed by depressing the lever I. The vent-valve is raised first and relieves the main valve from the pressure accumulated above it, and the main valve is then raised easily. As soon as the main valve commences to rise the water rushes direct through the holes or slots $e'$ and through the opening of the main-valve seat. The main valve is easily raised to its full extent, as it has merely to force the water out of the casing through the vent-valve.

When the lever I has been depressed to its full extent, it is let go, and the two valves descend automatically. The strong rush of water, which flushes the pan, ceases as soon as the bottom edge of the cylinder 8 enters the cylinder $5'$, and the water which passes around the cylinders 7 and 8 forms a gentle afterrush sufficient to fill the pan to the required level. The volume of water delivered at each operation may be regulated or made uniform for different pressures by means of the ring $e$, which varies the area of the inlet-opening. The time during which water may flow is regulated by turning the valve-stem H. When the double eye is screwed high up on the stem, the valves will not be raised so high and will descend sooner than when the stem is turned, so that the double eye is in a lower position.

The parts which I have hereinbefore described and do not hereinafter claim are claimed in a separate application filed August 16, 1895, Serial No. 559,496.

What I claim is—

1. In a water-closet, the combination, with a pan, and a flushing-valve at the pan; of a raised cistern, a supply-pipe extending between the said cistern and valve, and an overflow-pipe projecting through the said supply-pipe and delivering into the pan, substantially as set forth.

2. In a water-closet, the combination, with a raised cistern, and a supply-pipe; of a longitudinal obstruction—such as a pipe—arranged centrally of the said supply-pipe, whereby vortex whirls are prevented, substantially as set forth.

3. In a water-closet, the combination, with a raised cistern, and a flushing-valve provided with an inlet-chamber having a projecting socket; of a supply-pipe screwed into the said socket and secured to the cistern, an overflow-pipe passing through the said supply-pipe and socket, and a short pipe connection between the lower end of the said overflow-pipe and the outlet-chamber of the said valve, substantially as set forth.

4. The combination, with a main valve, and a casing inclosing the said valve and provided with a water-inlet at its lower part, and a passage connecting its upper and lower parts;

of a ring slidable on the said casing and operating to adjust the area of the water-inlet, a vent-valve carried by the said main valve, and a stem operating to raise first the vent-valve and then the main valve, substantially as set forth.

5. The combination, with a main valve, and a casing inclosing the said valve and provided with slots for the inlet of water at its lower part, and a passage connecting its upper and lower parts; of a ring screwed upon the said casing and affording a means for adjusting the area of the slots, a vent-valve carried by the said main valve, and a stem operating to raise first the vent-valve and then the main valve, substantially as set forth.

6. The combination, with a main valve, of an outlet-chamber provided with a cylinder depending from its upper part and forming an air-vessel under the valve-seat, a casing inclosing the main valve and provided with a water-inlet at its lower part and a passage connecting its upper and lower parts, a vent-valve carried by the said main valve, and a stem operating to raise first the vent-valve and then the main valve, substantially as set forth.

7. The combination, with a main valve, and its seat; of telescopic cylinders attached to the under side of the said valve and operating to cause a gentle afterrush, means for regulating the relative positions of the said cylinders, a casing inclosing the main valve and provided with a water-inlet at its lower part and a passage connecting its upper and lower parts, a vent-valve carried by the said main valve, and a stem operating to raise first the vent-valve and then the main valve, substantially as set forth.

8. The combination, with the outlet-chamber of a flushing-valve provided with a stuffing-box, and an oscillatory valve-operating spindle journaled in the said stuffing-box and provided with a projecting stop; of an arm pivoted to the said stuffing-box, projecting into the path of the said stop, and provided with a forked portion for engaging with the nut of the stuffing-box, substantially as set forth.

9. The combination, with a flushing-valve, and its seat; of cylinders on the under side of the valve, an annular space being formed between the said cylinders and the valve-seat, and one of the said cylinders being adjustable vertically, whereby the afterrush of water through the said annular space may be varied, substantially as set forth.

In testimony whereof I affix my signature in presence of two witnesses.

DAVID T. KENNEY.

Witnesses:
JAMES A. DALEY,
JAMES H. LAWLER.